US006808449B1

United States Patent
Pardijs et al.

(10) Patent No.: US 6,808,449 B1
(45) Date of Patent: Oct. 26, 2004

(54) METHOD AND APPARATUS FOR POSITIONING THE FRONT LEGS OF A CARCASS OF A SLAUGHTERED ANIMAL SUSPENDED FROM THE HIND LEGS

(75) Inventors: Hendrik Jan Pardijs, Winterswijk (NL); Gerard Jan Post, Hengelo (NL)

(73) Assignee: Humboldt B.V. (NL)

( * ) Notice: Subject to any disclaimer, the term of this patent is extended or adjusted under 35 U.S.C. 154(b) by 0 days.

(21) Appl. No.: 09/979,484

(22) PCT Filed: May 17, 2000

(86) PCT No.: PCT/NL00/00337

§ 371 (c)(1),
(2), (4) Date: Feb. 20, 2002

(87) PCT Pub. No.: WO00/70957

PCT Pub. Date: Nov. 30, 2000

(30) Foreign Application Priority Data

May 21, 1999 (NL) .............................. 1012132

(51) Int. Cl.[7] .............................................. A22B 5/06
(52) U.S. Cl. ..................................................... 452/197
(58) Field of Search ........................ 452/152–157, 452/160, 163, 164, 167, 170, 191, 197, 187–190

(56) References Cited

U.S. PATENT DOCUMENTS

| 4,653,150 | A | * | 3/1987 | Leining ....................... 452/160 |
| 5,147,240 | A | * | 9/1992 | Hazenbroek et al. ....... 452/160 |
| 5,160,295 | A | | 11/1992 | Bekkers ....................... 452/160 |
| 5,626,515 | A | * | 5/1997 | Krogh .......................... 452/160 |
| 5,655,960 | A | * | 8/1997 | Van Horeebeck ........... 452/149 |
| 5,779,533 | A | * | 7/1998 | Jacobs et al. ................ 452/160 |

FOREIGN PATENT DOCUMENTS

| BE | 1007533 | 7/1995 |
| DE | 3319261 | 11/1984 |
| EP | 0247763 | 12/1987 |
| NL | 9001154 | 12/1991 |

\* cited by examiner

Primary Examiner—Thomas Price
(74) Attorney, Agent, or Firm—Webb Ziesenheim Logsdon Orkin & Hanson, P.C.

(57) ABSTRACT

Method for positioning the front legs of a carcass of a slaughtered animal suspended from the hind legs by engaging on the front legs with positioning means and subsequently displacing the positioning means such that they carry the front legs into a desired position. The invention also relates to an apparatus for performing such a method, wherein the processing station is provided with a positioning member for bringing the front legs of the carcass into a desired position and the control for the positioning means is coupled to the control for the automatic processing station.

13 Claims, 2 Drawing Sheets

METHOD AND APPARATUS FOR POSITIONING THE FRONT LEGS OF A CARCASS OF A SLAUGHTERED ANIMAL SUSPENDED FROM THE HIND LEGS

BACKGROUND OF THE INVENTION

1. Field of the Invention

The invention relates to a method for positioning the front legs of a carcass of a slaughtered animal suspended from the hind legs by engaging on the front legs with positioning means and subsequently displacing the positioning means such that they carry the front legs into a desired position by pressing the front legs apart until they take up a desired pressed-apart position. The invention also relates to an apparatus for positioning the front legs of a carcass of a slaughtered animal suspended from the hind legs, comprising: suspending means for suspending a carcass of a slaughtered animal from the hind legs and positioning means for engaging on the front legs of the carcass by pressing apart the front legs until they take up a desired pressed-apart position.

2. Description of the Related Art

Automated performing of operations on a carcass of a slaughtered animal suspended from the hind legs is generally known. It is likewise known that for successful performance of an operation a carcass for processing has to be situated in a determined position The Netherlands publication NL 9001154 describes an apparatus for forming a cut in breast and belly of a carcass. For spreading of the front legs there are provided two square push rods which are rotatable with separate drive means to thus move apart the front legs. This construction and the processing to be performed therewith are relatively complex.

It is found in practice however that a considerable percentage of the processed carcasses are processed at an incorrect position, particularly when an operation is carried out in the belly or breast cavity. This can result in among other things problems in further processing (due for instance to carcass parts of unequal size) and/or to reduced yields. An important cause of processing of the carcasses at an incorrect position lies in the fact that one or both front legs of the carcass are situated in the path of a processing to be carried out and thus hamper a precise processing of the carcass. Another cause of less precise performance of operations is that some of the carcasses for processing are suspended asymmetrically.

The present invention therefore has for its object to provide a method and apparatus of the type stated in the preamble with which, while preserving the advantages of the prior art, operations can be performed more precisely on particularly the belly and breast cavity of carcasses of slaughtered animals suspended from the hind legs.

SUMMARY OF THE INVENTION

The invention provides for this purpose a method of the type stated in the preamble, characterized in that the positioning means comprise a single substantially rigid positioning member which is urged between the front legs of the slaughtered animal. An automated processing is preferably performed on a thus suspended and positioned carcass. Using the method according to the invention the front legs can be carried in very simple manner out of the path of a processing such that they do not disrupt the processing. The front legs can moreover be placed very simply at a minimal distance from each other while making use of very simple and single positioning means, such as for instance a wedge-shaped member. Movement of the single positioning member is very simple to control and the chances for incorrect positioning the front legs are minimal. It is found in practice that the stunning of the animals for slaughter, which usually takes place before the animal is killed, can result in some cases in (undesired) muscle contraction in the front legs. After slaughter the front legs of a number of carcasses can hereby be situated at a short mutual distance or even be crossed. If now the front legs of each carcass are situated at least a sufficiently great minimal distance from one another, automatic operations can be carried out more precisely. Another important advantage is that the front legs can thus be placed in a symmetrical position. The advantage of a symmetrical carcass is that this further increases the accuracy with which operations can be performed.

The European patent application EP 0 247 763 describes a carcass splitting apparatus. As a component of the apparatus is described a carriage for holding arms on which arms are mounted in rigid manner. A carcass for processing is urged by these arms against a back plate during the splitting. Other than in the method according to the invention, the arms do not engage on the front legs of the carcass.

The Belgian patent BE 1 007 533 describes a cutting machine for removing front legs from hanging animals with a guillotine system. Prior to severing the front legs are placed in a horizontal position by means of a carrier engaging from the underside on the front legs of a pig. Positioning the front legs in this machine is far more complex and will lead to a substantial percentage of incorrectly positioned animals.

The German Offenlegungsschrift DE 33 19 261 describes an apparatus for opening slaughtered animals provided with spreading fingers which engage on the insides of the front legs and then urge them apart. Similarly to the above discussed apparatus of the Netherlands publication, this construction and the processing to be performed therewith are also relatively complex and less effective than the method and apparatus according to the present invention.

In a preferred application of the method for performing an automated processing on a carcass of a slaughtered animal suspended from the hind legs as described above, the positioning member for placing the front legs of the carcass in a desired position is carried into an active position simultaneously with the displacement to an active position of a tool for performing the automated processing. The front legs of the carcass are herein already placed in a desired position prior to the start of the automated processing. Owing to displacement of the positioning means simultaneously with the displacement to an active position of a tool for performing the automated processing, practically no additional effort is required to bring the front legs into the correct position. Furthermore, the front legs are in any case situated in the sought-after position when the processing is carried out. So as not to disrupt the processing it is recommended that the front legs of the carcass are already placed in a desired position (shortly) before the start of the automated processing. The control can be derived from the control for a tool or can be directly coupled to the control for a tool.

Operations to which positioning of the front legs can advantageously be coupled are: automatic opening of breast and/or belly, automatic measuring of at least one carcass dimension and the severing of the front legs. Other possible operations wherein it may be useful to position the front legs are the automatic release and/or removal of entrails, the automatic removal of leaf-fat and splitting of the carcass. The position of the body of the carcass plays an important part in all these operations; when this is more controlled, the accuracy with which the operation can be performed will also increase. A special position is taken here by the automatic measurement of at least one carcass dimension The carrying out of a measurement is also deemed in this application as performing an operation. Particularly when the implant of the front legs is measured (on armpit and/or shoulder side) it is particularly advantageous to position the front legs precisely prior thereto. This considerably enhances the accuracy with which the measurement can be made.

The positioning member is preferably cleaned between engagement on successive carcasses. The importance of hygiene in a slaughterhouse is very great. Because the positioning means make physical contact with the carcasses it is desirable to clean these means repeatedly so that the danger of contaminants and/or cross-infections being transferred by the positioning means is reduced.

The invention also provides an apparatus of the type stated in the preamble, characterized in that the positioning means comprise a single substantially rigid positioning member for urging between the front legs of a carcass. The apparatus is preferably also provided with one processing station for performing an automatic processing on the carcass with positioned front legs, which processing station is coupled to the positioning means for placing the front legs of the carcass in a desired position, and a control for the positioning member is coupled to a control for the automatic processing station. It is also possible to fully integrate the controls for the positioning member and the processing station. The advantages of positioning the front legs have already been described above with reference to the method according to the invention. Owing to the coupling of processing station and positioning member no additional control is required for the positioning member. This reduces the cost of positioning the front legs. Because synchronization of processing station and positioning member is also unnecessary, there is hardly any increased chance of malfunctions resulting from the addition of the positioning means.

In preference the positioning member is substantially wedge-shaped. In a further preferred embodiment the engaging member also comprises a transition zone which connects onto the wedge-shaped positioning member and of which the opposite sides engaging onto the front legs run substantially parallel to each other. Such an engaging member, optionally provided with connecting transition zone, is structurally simple. The transition zone with opposite sides running substantially parallel to each other defines the minimum mutual distance between the front legs without it being important how far it is inserted between the front legs. An additional advantage hereof is that the minimum distance between the front legs is defined over a longer path of movement, which further simplifies the coupling to a processing station.

In yet another preferred embodiment the positioning member is coupled to a tool part of the processing station which is to be displaced to carry out a processing. This can be realized for instance in that the positioning member is coupled rotatably to the displaceable tool part via a drive for adjusting the angular position of the positioning member relative to the displaceable tool part. A movable head of the processing station is usually placed at least a very short distance from the carcasses. By now also mounting the positioning member on such a head, these now co-displace automatically with the processing station. In order to activate respectively deactivate the positioning member at the desired moment, this latter can be provided with a separate drive, for instance a simple hydraulic or pneumatic cylinder.

Finally, the apparatus preferably also comprises cleaning means for cleaning the positioning member. Such cleaning means can for instance be provided with a container with at least one spray nozzle for distributing a cleaning liquid and at least one discharge for discharging cleaning liquid carried into the container and wherein the positioning means are displaceable into the container. The positioning member can be cleaned by the cleaning means between each engagement on successive carcasses, with the advantage of improved hygiene.

BRIEF DESCRIPTION OF THE DRAWINGS

The invention will be further elucidated with reference to the non-limitative embodiment shown in the following figures. Herein.

DETAILED DESCRIPTION OF THE PREFERRED EMBODIMENTS

Figure 1:
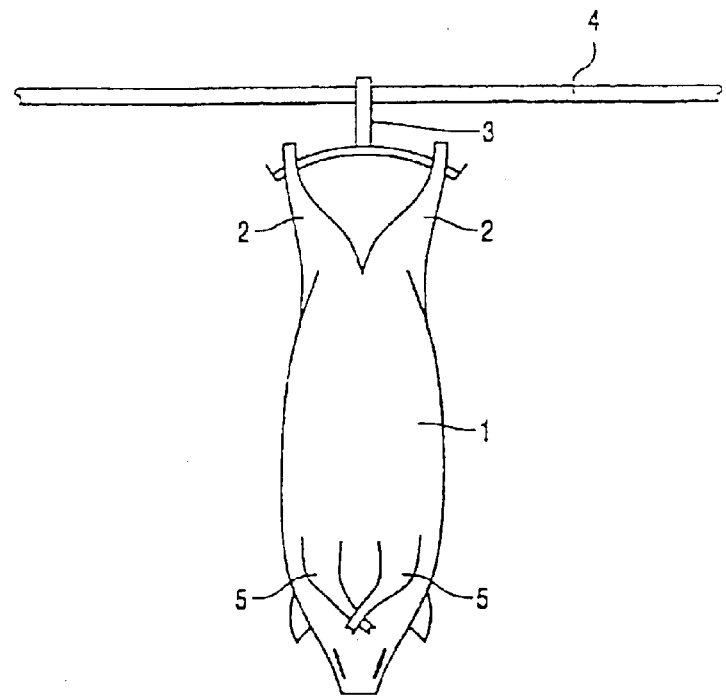
FIG. 1 shows a schematic view of a carcass of a slaughtered animal suspended from the hind legs, the front legs of which have been crossed by muscle contraction.

FIG. 1 shows a carcass 1 of a slaughtered animal which is suspended with hind legs 2 from a spreader 3 which is displaceable along a guide 4. Carcass 1 is the carcass of a pig which, prior to being killed, is first subjected to stunning. Although it is the intention to realize this stunning without this resulting in stress in the animals, it is found in practice that muscle contractions as a result of the stunning are difficult to prevent. A consequence hereof is that in the case of some of the animals the front legs 5 are situated at a short mutual distance or, as shown in this figure, front legs 5 are even crossed. The crossed front legs 5 form an obstruction to accurate performance of automated operations on carcass 1.

Figure 2:
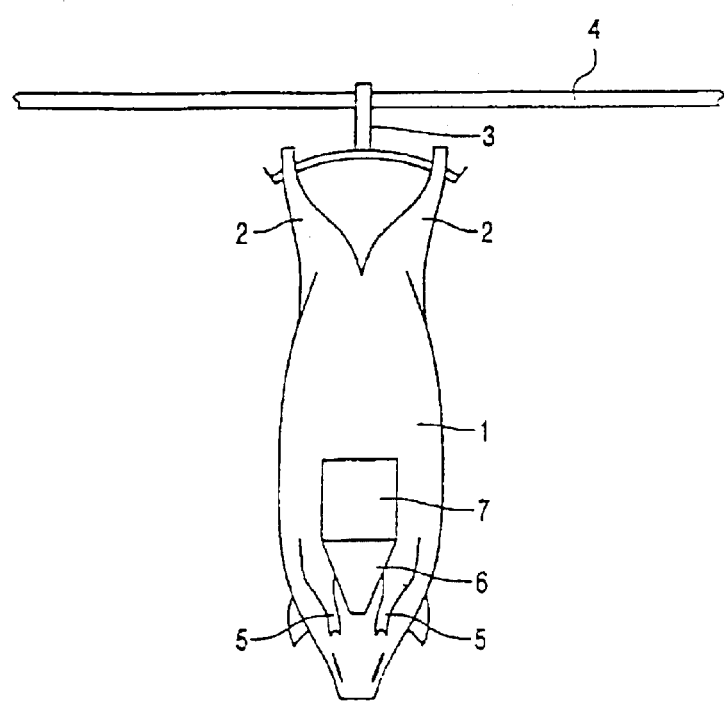
FIG. 2 shows a schematic view of the carcass shown in FIG. 1 after the front legs have been placed in a desired position according to the invention.

FIG. 2 shows schematically the situation in which a wedge-shaped positioning member 6 is pushed between front legs 5 such that these take up a desired position at a minimal mutual spacing. Positioning member 6 is combined with a tool part 7 with which a processing can be performed on carcass 1. This tool part 7 is shown schematically but can for instance consist of an evisceration unit, leaf-fat removers, a belly respectively breast opener and/or measuring means. It is noted emphatically that tool part 7 and the assembly of positioning member 6 and tool part 7 are shown very schematically. Reference is made to the following figure for a more detailed example.

Figure 3:
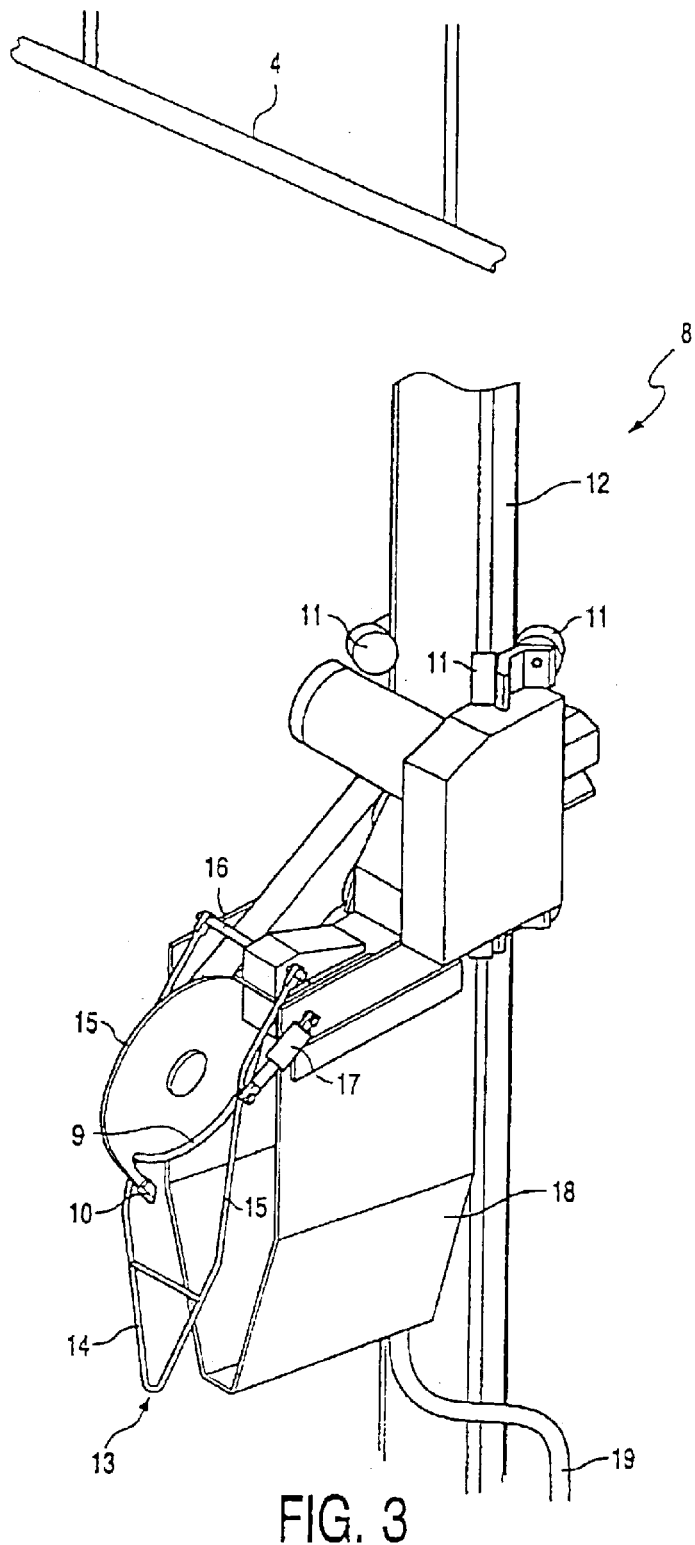
FIG. 3 is a perspective view of the apparatus according to the invention.

FIG. 3 shows a processing station 8 for opening breast and belly. Processing station 8 is provided for this purpose with a rotatable knife 9 which, also using a stop 10, is brought into contact to a determined depth with the carcasses for processing. The rotatable knife is then moved vertically by displacing guide means 11 vertically along an upright 12.

In order to urge the front legs 5 of a carcass into a desired position, processing station 8 is provided with a bracket 13 with a wedge-shaped outer end 14. The two rods 15 connecting onto wedge-shaped outer end 14 run substantially parallel to each other. Bracket 13 is rotatable round a shaft 16 connected to processing station 8. The angular position of bracket 13 relative to processing station 8 can be determined by means of a cylinder 17. When rotatable knife 9 is brought into contact with a carcass for processing, the bracket 13 is thus then moved simultaneously to the carcass such that the front legs can thereby be pressed apart. In order to deactivate bracket 13, but particularly in order to clean it between engagement on successive carcasses, bracket 13 can be moved into a container 18 using cylinder 17. Arranged in this container 18 are spray nozzles (not shown) from which cleaning liquid can be sprayed onto bracket 13. Also connecting onto container 18 is a discharge 19 for draining used cleaning liquid. In order to cause the cleaning liquid to flow to discharge 19, the bottom of container 18 can be embodied sloping down toward discharge 19. It is otherwise noted that rotatable knife 9 with stop 10 can also be carried into container 18 for cleaning.

Although the invention is elucidated with reference to only a single embodiment, it will be apparent to all that the invention is by no means limited to the described and shown embodiment. On the contrary, many variations are still possible for the skilled person within the scope of the invention.

What is claimed is:

1. A method for positioning front legs of a carcass of a slaughtered animal suspended from the animal's hind legs, comprising the steps of:

engaging the front legs with positioning means; and subsequently vertically displacing the positioning means such that the positioning means force apart the front legs into a desired pressed-apart position, wherein the positioning means comprise a single substantially rigid positioning member which is urged between the front legs of the slaughtered animal during the vertical displacing of the positioning means, and the positioning member comprises a pair of contact sides defining a wedge-shape and is positioned such that the contact sides converge toward the direction of travel during the vertical displacing.

2. The method as claimed in claim 1, wherein at least one automated processing is also performed on the carcass suspended from the hind legs and the positioning member is carried into an active position simultaneously with the displacement to an active position of a tool for performing the automated processing.

3. The method as claimed in claim 2, wherein the front legs of the carcass are already placed in a desired position prior to the start of the automated processing.

4. The method as claimed in claim 2, wherein the processing is the automatic opening of breast and/or belly.

5. The method as claimed in claim 2, wherein the processing is the automatic measuring of at least one carcass dimension.

6. The method as claimed in claim 2, wherein the processing is the severing of the front legs.

7. The method as claimed in claim 1, wherein the positioning member is cleaned between engagement on successive carcasses.

8. An apparatus for positioning front legs of a carcass of a slaughtered animal suspended from the animal's hind legs, comprising:

a suspending means for suspending the carcass of the slaughtered animal from the hind legs; and positioning means for engaging the front legs of the carcass and pressing apart the front legs into a desired pressed-apart position, wherein the positioning means comprise a single substantially rigid positioning member for urging between the front legs of the carcass during vertical displacement of the positioning means, and the positioning member comprises a pair of contact sides defining a wedge-shape and is positioned such that the contact sides converge toward the direction of travel during the vertical displacing.

9. The apparatus as claimed in claim 8, wherein the positioning means for engaging comprises a transition zone which connects onto the positioning member and of which opposite sides engaging onto the front legs run substantially parallel to each other.

10. The apparatus as claimed in claim 8, wherein the positioning member is coupled to a displacing tool part of a processing station which is to be displaced to carry out a processing.

11. The apparatus as claimed in claim 10, wherein the positioning member is coupled rotatably to the displaceable tool part via a drive for adjusting the angular position of the positioning member relative to the tool part.

12. The apparatus as claimed in claim 8, wherein the apparatus also comprises cleaning means for cleaning the positioning member.

13. The apparatus as claimed in claim 12, wherein the cleaning means are provided with a container with at least one spray nozzle for distributing a cleaning liquid and at least one discharge for discharging cleaning liquid carried into the container and wherein the positioning member is displaceable into the container.

* * * * *